United States Patent [19]
Kossoff

[11] 3,881,164
[45] Apr. 29, 1975

[54] CROSS ARRAY ULTRASONIC TRANSDUCER

[75] Inventor: George Kossoff, Northbridge, New South Wales, Australia

[73] Assignee: The Commonwealth of Australia, Phillip, Australia

[22] Filed: Sept. 13, 1973

[21] Appl. No.: 396,875

[52] U.S. Cl.................... 340/1 R; 73/67.7; 340/9
[51] Int. Cl............................................. G01s 9/66
[58] Field of Search............ 340/5 MP, 5 H, 8 L, 9, 340/10, 1 R; 73/67.7

[56] References Cited
UNITED STATES PATENTS

| | | | |
|---|---|---|---|
| 3,086,195 | 4/1963 | Halliday | 340/15 |
| 3,559,159 | 1/1971 | Harms et al. | 340/5 R |
| 3,685,051 | 8/1972 | Wells | 340/5 H |

Primary Examiner—Richard A. Farley

[57] ABSTRACT

Apparatus for ultrasonic examination of objects, particularly in medical diagnostic examination, is comprised of a first phased array transducer capable of focusing the beam of pulses of ultrasonic energy in the longitudinal plane of the transducer positioned transverse to the longitudinal plane of the first transducer. The second transducer is capable of being focused in the same plane as the first transducer.

4 Claims, 1 Drawing Figure

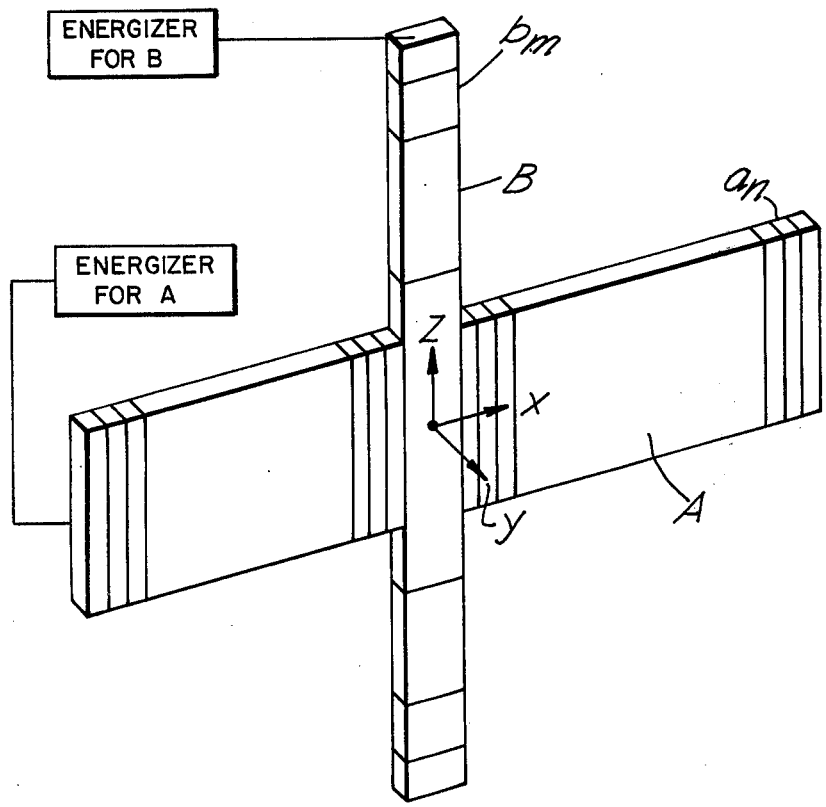

CROSS ARRAY ULTRASONIC TRANSDUCER

This invention relates to the technique of ultrasonic echoscopy of ojbects and in particular to an extension of known techniques of ultrasonic echoscopy to provide more useful information concerning the examined objects. It is particularly, but not solely, directed to the more effective acquisition of data in medical diagnosis utilising this technique.

Ultrasonic echoscopy provides information about an examined object which may be displayed in the form of an ultrasonic echogram. Such an echogram consists of a display of acoustic impedance discontinuities or reflecting surfaces in the object. It is obtained by directing a short pulse of ultrasonic energy, typically in the 1–30 MH z frequency range, into the examined object where any acoustic impedance discontinuities in the object reflect and return some of the energy in the form of an echo. This echo is received, converted into an electric signal and displayed as an echogram on a cathode ray oscilloscope, a film, a chart or the like.

The echogram may consistute either a one dimensional or a two dimensional representation and in both cases the information is contained in the position and magnitude of the echo displayed. In a one dimensional display, the position along a base line is used to indicate the distance to the reflecting surface whilst the magnitude of the echo is displayed, for example, as a deflection of the base line or as an intensity change. In a two dimensional display, the position along a base line is used to indicate the distance to the reflecting surface as in a one dimensional display, and the direction of the base line is used to represent the direction of propagation of the acoustic energy. The two dimensional display is obtained by changing this direction of propagation of the acoustic energy and by instituting a similar but not necessarily identical movement of the base line of the display. The magnitude of the echo is displayed as for a one dimensional display; for example, as a deflection of the base line or as an intensity change.

The technique of ultrasonic echoscopy is used in medical diagnosis to obtain information about the anatomy of patients. The application of the technique is now widely investigated and is described, for example, by D.E. Robinson in Proceeding of the Institution of Radio and Electronics Engineers Australia, Vol. 31, No. 11, pages 385–392, Nov., 1970; "The application of Ultrasound in Medical Diagnosis." As pointed out in this article, ultrasonic echoscopy may be used to produce displays resembling anatomical cross-sections which have proved clinically useful when the desired information concerns physical diemsnions, shapes of organs of structures or the like. Ultrasonic echography has proved of particular value as a diagnostic aid in the abdomen and pregnant uterus, eye, breast, brain, lung, kidney, liver and heart, these being areas of soft tissue with little bone and air. In general, the technique is considered to complement other techniques to provide a more complete picture of the patients condition, however particularly in pregnancies, ultrasonic echoscopy may be useful in place of X-rays where the latter may not give sufficient information or may be dangerous. In medical use, a pulse of ultrasonic energy is transmitted into a patient in a known direction and echoes are received from reflecting surfaces within the body. The time delay between a transmitted pulse and the received echo depends on the distance from the transmitter to the reflecting surface and the distance information so obtained may be displayed in a suitable way for interpretation and clinical use as a one dimensional range reading or as a two dimensional cross section as previously described.

If a pulse of ultrasound is propagated into a medium, echoes will be received at various time delays and these time delays will be proportional to the distances from the transducer producing the pulse to the interfaces provided the velocity of propagation is constant. In soft tissues found in the human body the velocity of sound is reasonably constant and pulsed ultrasound provides a convenient method of measuring the depth of a particular structure from the transducer face without inconvenience to the patient. This information can be used in a number of ways.

In the simplest form of display, "A mode," the echoes are presented as deflections of the trace of an oscilloscope in which distance is represented along the time axis. This mode is useful clinically when the source of the various echoes displayed can be positively identified. It is possible to measure the distance between two echoes, or between the energising pulse and an echo, with accurancy but it may not be possible to identify the source of the echoes. It has been used to measure the size of the baby's head inside the uterus, the depth of the eye and the bladder and to locate the mid-line in the brain. Similar information may be displayed by use of the "B mode" in which the echoes are presented as a brightening or intensity modulation of the time-base trace.

If the interface of interest is moving, its position may be plotted with time ("M mode") by using the B mode presentation and allowing the time base to be swept at right angles to its direction so as to display the movements of the interface echo backwards and forwards along the time base. This is used to demonstrate the pulsatile movements of various parts of the heart and brain. If the B mode is used but the trace on the screen is made to represent the line of sight of the transducer and then the transducer is scanned around the patient and the time base line on the screen made to follow, a two-dimensional plot of impedance discontinuities is obtained. Two dimensional visualisation has been used in the pregnant uterus, abdomen, eye and breat.

Coupling from the transducer to the patient may be achieved by skin contact by use of a water delay bath. If a water delay bath is used the distance between the transducer and the skin surface must be greater than the largest depth of penetration to be used, to avoid ambiguity due to multiple reflection. In general the skin contact scan results in greater comfort for the patient and echograms of less clarity while the water delay scan gives less patient comfort and better quality echograms.

Focusing of transducers used in ultrasonic echoscopy is known to reduce the width of the ultrasonic beams generated by the transducer and thus improved the lateral resolution. Known methods of reducing the width of an ultrasonic beam by focusing or shaping the beam include (i) focusing with a lens of a mirror in a manner similar to focusing in optics, (ii) use of a curved transducer, and (iii) use of a multi-element transducer (known as a phased array) in which the elements of the transducer are energised at progressively different times to generate the desired shape of the beam. For example, a phased array can be focused in a known manner by energizing simultaneously the first and last elements ($a_1$ and $a_{n+1}$), and then energizing the next two elements ($a_2$ and $a_n$), and so on until finally the center element has been energized.

The present invention relates to the focusing of a phased array transducer as previously described and it is a principal object of this invention to provide apparatus for electronically focusing a phased array transducer on to a selected point in space.

According to this invention, there is provided apparatus for the ultrasonic examination of an object comprising a first phased array transducer capable of directing pulses of ultrasonic energy along a beam into the said object and of focusing the beam in the longitudinal plane of the transducer, and a second phased array transducer positioned with its longitudinal plane transverse to the longitudinal plane of said first phased array transducer, said second phased array transducer being capable of being focused in the longitudinal plane of said first phased array transducer.

The first and second phased array transducers are preferably each comprised of a plurality of narrow rectangular elements and the beams thereof focused by energising said elements at progressively different times.

Other objects and features of the invention will be apparent from the accompanying drawing which schematically represents an embodiment of the present invention.

The direction and shape of an ultrasonic beam emitted by a phased array transducer A composed of a number of narrow rectangular elements $a_n$ may be set by energising the elements at progressively different times. This beam shaping is achieved only in the long axis plane, i.e., the $x$-$y$ plane of the transducer, while the shape of the beam in the width, i.e., the $z$-$y$ plane is determined by the width dimension of the array. Typically, as the length dimension of the phased array transducer A is larger than its width dimension, the ultrasonic beam is narrower in the $x$-$y$ plane so that the resolution in that plane is better than in the $z$-$y$ plane.

The present invention is embodied in the use of a second phased array transducer B composed of a number of narrow rectangular elements $b_m$ which, by suitable delay of signals received by its elements, is electronically focused on the $x$-$y$ plane. The length dimension of the elements of this array are preferably chosen to provide the focusing on to the $x$-$y$ plane, while the width of the elements is preferably made sufficiently narrow so that the array is operative over the directions where the beam is deviated by the phased array transducer. A. As shown in the drawing, the design of the element of the two arrays are different. For operations of array A, many small elements are used, whereas the focusing reception operation of the array B is achieved by using considerably fewer elements. This array is also designed to be relatively narrow to achieve its focusing operation within the beam deviation (steering angle) of array A.

From the foregoing description it will therefore be appreciated that the present invention enables the use of a cross phased array transducer to electronically focus on to a selected point in space in the plane of one of the arms of the cross. While the invention has been described with reference to an illustrative embodiment, it will generally be understood by those skilled in the art that various changes may be made and equivalents be substituted for elements thereof without departing from the true spirit and scope of the invention.

The claims defining the invention are as follows:

1. Apparatus for the ultrasonic examination of an object comprising:

a first phased array transducer comprising a first plurality of elements;

a first transducer energizing means for progressively energizing selected ones of said elements to form a beam of pulses of ultrasonic energy directed into the object and focused in the longitudinal plane of the transducer;

a second phased array transducer comprising a second plurality of elements different in size and quantity from the elements in said first plurality of elements positioned with its longitudinal plane transverse to the longitudinal plane of said first phased array transducer;

a second transducer energizing means for progressively energizing selective ones of said second plurality of elements to focus said second phased array transducer in the longitudinal plane of said first phased array transducer.

2. The apparatus as claimed in claim 1, wherein said first and second plurality of elements comprise narrow rectangular elements.

3. The apparatus as claimed in claim 1, wherein the elements of said first plurality of elements are narrower and more numerous than the elements of said second plurality of elements.

4. Apparatus as claimed in claim 2, characterised in that the length dimension of said elements of said second phased array transducer is chosen to provide the focusing in the longitudinal plane of said first phased array transducer.

* * * * *